2,805,954
Patented Sept. 10, 1957

2,805,954
BITUMINOUS COMPOSITION

William F. Fair, Cranford, N. J., assignor to Koppers Company, Inc., a corporation of Delaware No Drawing. Application January 12, 1954,
Serial No. 403,649

3 Claims. (Cl. 106—278)

This invention relates in general to improved bituminous compositions. More specifically, it relates to bituminous compositions containing fillers, which compositions are resistant to substantial sedimentation when stored for long periods of time. Additionally, the instant invention relates to bituminous compositions which give coatings of excellent weathering properties and to compositions possessing a consistency suitable for easy and effective application to surfaces.

Heretofore certain bituminous compositions containing fillers have not been too satisfactory from the standpoint of storage behavior and shelf life. The fillers of these compositions have settled upon prolonged standing, and it has been extremely difficult to redisperse these settled fillers. This poor storage behavior has obviously been undesirable from a commercial standpoint. Additionally, this behavior has presented the further disadvantage of preventing the accumulation and storage of any sizable inventory against anticipated future sales. These compositions have also been objectionable in that they have exhibited "alligatoring" and subsequent failure in the thin areas formed very soon after application to surfaces, particularly when the coating has been exposed to sunlight. It has also been difficult in the past to produce these compositions having the proper consistency for being easily and effectively applied over all the contours of surfaces.

It is therefore an object of the present invention to provide a bituminous filler-containing composition which is not subject to substantial sedimentation when stored for long periods of time.

Another object of the present invention is to provide a bituminous composition capable of producing a coating which is durable and highly resistant to the elements of the weather.

An additional object of the present invention is to provide a bituminous composition possessing a consistency suitable for easy and effective application to surfaces.

Ancillary and additional objects and advantages will be apparent as the invention is hereinafter described in more detail.

It has now been found that by admixing certain alkyl onium bentonites, such as dimethyldioctadecyl ammonium bentonite (marketed under the trademark "Bentone") with an approximately 1 to 1 mixture of a filler such as, for example, talc, and a cut-back-coal-tar pitch, flowable compositions of highly desirable storage, weathering and application characteristics are obtained.

More specifically, in practicing the invention, approximately equal portions by weight of talc and cut-back-coal-tar pitch, such as, for example 53.5 parts by weight of cut-back-coal-tar pitch and 44.7 parts by weight of talc, are charged to an appropriate mixer such as, for example, a 500 gallon sigma blade mixer. These constituents are then mixed for about 10 minutes. A small amount of dimethyldioctadecyl ammonium bentonite is then slowly added to this mixture, such as, for example, 0.24 pound of dimethyldioctadecyl ammonium bentonite ("Bentone 34") per gallon of the approximately 1 to 1 mixture of talc and cut-back-coal-tar pitch. The constituents are then heated to a temperature of not higher than 120° F. and mixed until homogeneous.

Although less than 0.24 pound of dimethyldioctadecyl ammonium or other onium bentonite may be utilized per gallon of the approximately 1 to 1 mixture of talc and cut-back-coal-tar pitch, about 0.24 pound of this "Bentone" per gallon of this mixture exhibits a highly effective result and is therefore very desirable from a commercial standpoint. Substantially more than 0.24 pound may be employed, if desired, as the amount of "Bentone" can be varied in accordance with the desired fluidity or consistency. A bituminous coating composition with an extremely high consistency would obviously be unsuitable for commercial application.

Likewise the amounts of filler, such as talc, and cut-back-coal-tar pitch which are utilized can be varied in accordance with the desired fluidity. Although we have found that a slightly greater portion of cut-back-coal-tar pitch than talc produces a highly desirable composition, approximately equal portions of cut-back and talc are advantageously utilized. However, it has been found that the presence of at least about 50 parts by weight of the cut-back-coal-tar pitch in the composition is desirable to produce a product having a fluidity or consistency advantageous for commercial application.

If desired, small amounts of a deodorant and/or wetting agent can be added to the constituents prior to final mixing. Wetting agents of the sulphonated bicarboxy acid ester type marketed under the trademark "Aerosol," and the sodium alkyl benzene sulfonate type sold under the trademarks, "Nacconol" and "Santomerse" are suitable.

Dimethyldioctadecyl ammonium bentonite is marketed under the trademark "Bentone 34." This compound can be produced by reacting an aqueous dispersion of sodium bentonite with an organic ammonium (or onium) salt, typically the acid form of dimethyldioctadecyl amine to form the organic ammonium or onium bentonite plus a salt. The reaction is reversible and formation of the "Bentone" is favored by the fact that it flocculates or precipitates out of solution. Within the scope of and for the practice of this invention other alkyl onium bentonites having long chain alkyl groups can also be used, such as diethyldioctadecyl ammonium bentonite, dimethyl di-n-dodecyl ammonium bentonite, etc., in which there is at least one alkyl group having a straight chain of at least 12 carbon atoms.

Examples of other onium bentonites, which are eminently adapted for practising the present invention and which are considered within the scope of this invention, are products in which the ammonium radical has been replaced by an onium base selected from the group consisting of the phosphonium, oxonium, sulfonium, arsonium, stibonium and telluronium bases. The particular dimethyldioctadecyl onium bentonites are utilized in approximately the same proportions as "Bentone-34." Additionally, the method of preparation is substantially identical as when "Bentone-34" is utilized.

The following examples are provided to illustrate some preferred compositions of the instant invention in which the parts are by weight unless otherwise specified, but are not to be construed as limitations thereon:

*Example I*

| | Percent |
|---|---|
| Cut-back-coal-tar pitch | 53.1 |
| Talc | 44.9 |
| "Bentone-34" | 2.0 |

Example II

| | Percent |
|---|---|
| Cut-back-coal-tar pitch | 53.5 |
| Talc | 44.7 |
| "Bentone-34" | 1.8 |

Example III

| | |
|---|---|
| Cut-back-coal-tar pitch | 53.4 |
| Talc | 44.56 |
| "Bentone-34" | 1.8 |
| Aerosol | .15 |
| Deodorant | .09 |

Example IV

| | |
|---|---|
| Cut-back-coal-tar pitch | 53.4 |
| Talc | 44.7 |
| Dimethyldioctadecyl phosphonium bentonite | 1.9 |

Example V

| | |
|---|---|
| Cut-back-coal-tar pitch | 52.8 |
| Talc | 45.1 |
| Dimethyldioctadecyl oxonium bentonite | 2.1 |

Example VI

| | |
|---|---|
| Cut-back-coal-tar pitch | 53.1 |
| Talc | 44.9 |
| Dimethyldioctadecyl sulfonium bentonite | 2.0 |

Example VII

| | |
|---|---|
| Cut-back-coal-tar pitch | 52.9 |
| Slate dust | 45.2 |
| Dimethyldioctadecyl arsonium bentonite | 1.9 |

Example VIII

| | |
|---|---|
| Cut-back-coal-tar pitch | 53.4 |
| Ground mica | 44.8 |
| Dimethyldioctadecyl sulfonium bentonite | 1.8 |

Example IX

| | |
|---|---|
| Cut-back-coal-tar pitch | 53.0 |
| Clay | 45.0 |
| Dimethyldioctadecyl stibonium bentonite | 2.0 |

Example X

| | |
|---|---|
| Cut-back-coal-tar pitch | 53.2 |
| Shale dust | 44.8 |
| Dimethyldioctadecyl telluronium bentonite | 2.0 |

In forming the cut-back-coal-tar pitch suitable for the practice of the instant invention, advantageously about 66% by weight of molten coal-tar pitch having a softening point in the range of 100° to 200° F. and a penetration as determined by A. S. T. M. method D5-52 of 5 decimillimeters minimum at 77° F. is dispersed in advantageously about 34% by weight of a preponderately aromatic low boiling coal-tar solvent having a boiling point range of from about 150° C. to about 200° C. with vigorous agitation. The agitation is continued for a brief period of time. Although the foregoing percentages of coal-tar pitch and coal-tar solvent produce a highly desirable cut-back-coal-tar pitch, it is to be understood that higher and lower percentages may be employed if desired. Coal-tar pitch may be utilized in an amount ranging from about 50% to about 70% by weight in making the cut-back and coal-tar solvent in an amount ranging from about 30% to about 50% by weight. More than about 50% of coal-tar solvent should not be utilized, however, as this wolud result in sludging and consequent settlement of material from the coal-tar pitch. Softening point values are determined herein by the A. S. T. M. ring and ball softening point test method D36-26.

The following composition and method of preparation is illustrative of a typical cut-back-coal-tar pitch suitable for the practice of the instant invention. The percentages, throughout this specification, are by weight unless otherwise specified.

Coal-tar pitch having a softening point advantageously of 150°-160° F. (ring and ball) and a penetration of 6 at 77° F. (A. S. T. M. method D5-52) is blown from a storage tank to a still by means of steam. The temperature of the still is then adjusted to approximately 250° F. If desired, an appropriate agitator or mixer may be run in the still to accelerate the temperature adjustment. A coal-tar naphtha having a boiling range of from about 150° C. to about 200° C. is then charged to the still in such an amount that there is present approximately 66% coal-tar pitch and approximately 34% coal-tar naphtha. This mixture is then stirred for a brief period of time, about 15 to 20 minutes generally sufficing, by means of an appropriate agitator or mixer such as, for example, a sigma blade mixer. At the end of this period, if it is so desired, a deodorant and/or a wetting agent may be incorporated into the mixture. The mixture is then ready to be utilized.

The coal tar solvent naphtha used in the preparation of cut-back-coal-tar pitch is one which contains the resinifiable materials ordinarily found therein. For good dispersion this naphtha advantageously should contain about 50% or more resinifiable materials such as indene and coumarone. Similar solvents can be utilized in whole or in part in place of the solvent naphtha. For example, fractions of heavy water-gas tar distillates and of light water-gas tar distillates, and petroleum distillates containing a preponderance of aromatics are satisfactory. The boiling points of these solvents can vary from about 150° C. to about 200° C.

The coal-tar solvent naphtha utilized in making the cut-back-coal-tar pitch can be prepared from a coal-tar distillate from which most of the tar acids and tar bases have been removed. This solvent naphtha has not more than 5% distillate at 150° C. and not less than 90% distillate at 200° C. The fraction of heavy water-gas-tar distillate, when used as a solvent in place of solvent naphtha, has similarly not more than 5% distillate at 150° C. and not more than 50% distillate at 200° C. The fraction of light water-gas-tar distillate, which also may be utilized as the solvent in making the cut-back, similarly has not more than 5% distillate at 150° C. and not more than 20% distillate at 200° C.

The heavy water-gas tar, from which is obtained the distillate fraction utilized in making the cut-back-coal-tar pitch, is procured from water-gas generator plants in which Bunker-C or similar fuel oils are used for carbureting. This tar consists mainly of aromatic constituents even though it is produced from a petroleum raw material. In certain industries, heavy water-gas tar is referred to as residuum tar to distinguish it from what is known as light water-gas tar. Light water-gas tar, a distillate fraction of which can also be utilized as a solvent in making the cut-back-coal-tar pitch, is to be differentiated from heavy water-gas tar and is produced by carbureting petroleum distillates in the carburetor of water-gas plants. Light water-gas tar is also generally referred to as water-gas tar.

It is to be noted that other fillers can be employed in our novel coating composition in place of the talc. For example, slate dust or flour, ground mica, clay, shale etc., can be utilized. The fillers are advantageously powdered sufficiently to pass substantially a 200 mesh sieve.

Tests were conducted utilizing the novel compositions of the instant invention. In these tests, two iron panels were employed; panel number 1 being coated with the present novel composition (containing a "Bentone") and panel number 2 being coated with a talc-cut-back-coal tar pitch composition (not containing a "Bentone"). Both panels were subjected to water and ultraviolet light alternately in a so-called accelerated aging device or "weatherometer." After 816 hours of this accelerated aging, the coating composition not containing the "Bentone" failed completely. On the contrary, the novel composition (containing a "Bentone") on panel number 2 did not exhibit rusting until after 1632 hours (twice as long) and did not fail completely until after 3600 hours.

Duplicate panels were placed outdoors in atmospheric weathering racks. After 2½ years, the composition containing the "Bentone" still protected the metal satisfactorily and exhibited no evidence of deterioration from weathering effects, while the composition (not containing a "Bentone") on panel 2 exhibited severe alligatoring.

To further illustrate the superiority and efficiency of the instant novel composition, three months after production, a 55-gallon drum of this composition had only a thin liquid layer on the surface and no sediment on the bottom. It appeared to be uniform throughout and was easily mixed. Another drum of this material standing undisturbed for eleven months outdoors had only a small amount of liquid on the surface and little or no sediment on the bottom. This material could be easily stirred even though it had been exposed to summer heat, and to temperatures below freezing. Laboratory tests showed that there was no appreciable change in consistency on standing. This material can be effectively applied at a rate of 200 square feet per gallon even after a considerable storage period.

What is claimed is:

1. A flowable coal-tar pitch-containing coating composition consisting essentially of a mixture of approximately equal quantities of filler and cut-back-coal-tar pitch, and a small amount of added dimethyldioctadecyl ammonium bentonite, said cut-back containing from about 50 to about 70% of coal-tar pitch having a ring and ball softening point in the range of 100° to 200° F. and from about 50 to about 30% of coal-tar solvent naphtha containing at least about 50% of resinifiable materials including indene and coumarone and boiling in the range of about 150–200° C.

2. A flowable coal-tar pitch-containing coating composition consisting essentially of a mixture of approximately equal quantities of filler and cut-back-coal-tar pitch, said cut-back-coal-tar pitch containing from about 50 to about 70% of coal-tar pitch having a ring and ball softening point in the range of 100° F. to 200° F. and a minimum penetration at 77° F. of 5 decimillimeters and from about 50 to about 30% of coal-tar solvent naphtha containing at least about 50% of resinifiable materials including indene and coumarone and having a boiling range of about 150–200° C.; and a small amount of added dimethyldioctadecyl ammonium bentonite.

3. A flowable coal-tar pitch-containing coating composition consisting of a mixture of about 44 parts by weight of talc and about 53 parts by weight of cut-back-coal-tar pitch, said cut-back-coal-tar pitch containing about 66% of coal-tar pitch having a ring and ball softening point in the range of 100° to 200° F. and a minimum penetration at 77° F. of 5 decimillimeters and about 34% of coal tar solvent naphtha containing at least about 50% of resinifiable materials including indene and coumarone and boiling in the range of about 150°–200° C.; and 0.24 pound of added dimethyldioctadecyl ammonium bentonite per gallon of the aforesaid mixture of talc and cut-back-coal-tar pitch.

References Cited in the file of this patent

UNITED STATES PATENTS

| | | |
|---|---|---|
| 1,991,196 | Deer | Feb. 12, 1935 |
| 2,123,560 | Bennett | July 12, 1938 |
| 2,178,770 | Zaisser | Nov. 7, 1939 |
| 2,255,825 | Skeen | Sept. 16, 1941 |
| 2,622,987 | Ratcliffe | Dec. 23, 1952 |
| 2,661,301 | Capell | Dec. 1, 1953 |